United States Patent

Gulli et al.

[19]

[11] Patent Number: 6,128,594
[45] Date of Patent: *Oct. 3, 2000

[54] PROCESS OF VOICE RECOGNITION IN A HARSH ENVIRONMENT, AND DEVICE FOR IMPLEMENTATION

[75] Inventors: Christian Gulli, Castelnau de Medoc; Dominique Pastor, St Loubes; Gérard Reynaud, Begles, all of France

[73] Assignee: Sextant Avionique, Velizy Villacoublay, France

[*] Notice: This patent issued on a continued prosecution application filed under 37 CFR 1.53(d), and is subject to the twenty year patent term provisions of 35 U.S.C. 154(a)(2).

[21] Appl. No.: 08/913,849
[22] PCT Filed: Jan. 24, 1997
[86] PCT No.: PCT/FR97/00147
    § 371 Date: Sep. 26, 1997
    § 102(e) Date: Sep. 26, 1997
[87] PCT Pub. No.: WO97/27577
    PCT Pub. Date: Jul. 31, 1997

[30] Foreign Application Priority Data

Jan. 26, 1996 [FR] France ................................. 96 00934

[51] Int. Cl.⁷ ............................ G10L 15/06; G10L 15/22
[52] U.S. Cl. ........................... 704/244; 704/247; 704/275
[58] Field of Search ............................ 704/10, 226, 231, 704/246, 250, 270, 275, 251, 252, 253, 254, 257, 233, 244, 247

[56] References Cited

U.S. PATENT DOCUMENTS

| | | | |
|---|---|---|---|
| 4,593,403 | 6/1986 | Kishi et al. | 704/275 |
| 4,637,045 | 1/1987 | Noso et al. | 704/275 |
| 4,725,956 | 2/1988 | Jenkins | 704/275 |
| 4,797,924 | 1/1989 | Schnars et al. | 704/275 |
| 4,827,518 | 5/1989 | Feustel et al. | 704/246 |
| 5,058,081 | 10/1991 | Gulli et al. | |
| 5,214,707 | 5/1993 | Fujimoto et al. | 704/275 |
| 5,241,619 | 8/1993 | Schwartz et al. | 704/200 |
| 5,337,251 | 8/1994 | Pastor . | |
| 5,390,278 | 2/1995 | Gupta et al. | 704/243 |
| 5,500,903 | 3/1996 | Gulli . | |
| 5,511,009 | 4/1996 | Pastor . | |
| 5,572,623 | 11/1996 | Pastor . | |
| 5,592,385 | 1/1997 | Katayama et al. | 704/246 |
| 5,677,990 | 10/1997 | Junqua | 704/270 |
| 5,712,957 | 1/1998 | Waibel et al. | 704/240 |
| 5,805,772 | 9/1998 | Chou et al. | 704/255 |
| 5,826,232 | 10/1998 | Gulli | 704/267 |
| 5,848,389 | 12/1998 | Asano et al. | 704/277 |
| 5,937,383 | 8/1999 | Ittycheriah et al. | 704/255 |
| 5,987,142 | 11/1999 | Courneau et al. | 381/310 |
| 5,991,721 | 11/1999 | Asano et al. | 704/257 |

FOREIGN PATENT DOCUMENTS

| 238695 | 9/1987 | European Pat. Off. . |
| 592280 | 4/1994 | European Pat. Off. . |

OTHER PUBLICATIONS

Kanno et al., "Generalized Cepstral Modeling of Degraded Speech and Its Application to Speech Enhancement," IEICE Trans. Fundamentals, vol. E76–A, No. 8, Aug. 1993, pp. 1300–1307.

Wrench et al., A New Approach to Noise–Robust LPC, Proceddings ICASSP, IEEE Acoustics, Speech, and Signal Society, vol. 1, Apr. 1987, pp. 305–307.

*Primary Examiner*—Richemond Dorvil
*Assistant Examiner*—Martin Lerner
*Attorney, Agent, or Firm*—Oblon, Spivak, McClelland, Maier & Neustadt, P.C.

[57] ABSTRACT

A process for voice recognition in a harsh environment such as the cockpit of a military aircraft. An acquisition device is connected to an acoustico-phonetic decoding device which is then connected to a recognition supervisor. The acquisition device is also connected to a voice recognition device which is also connected to the recognition supervisor. The voice recognition device is also connected to a dictionary and to a syntax describing device. The syntax describing device is connected to a dialogue model as well as the recognition supervisor.

20 Claims, 1 Drawing Sheet

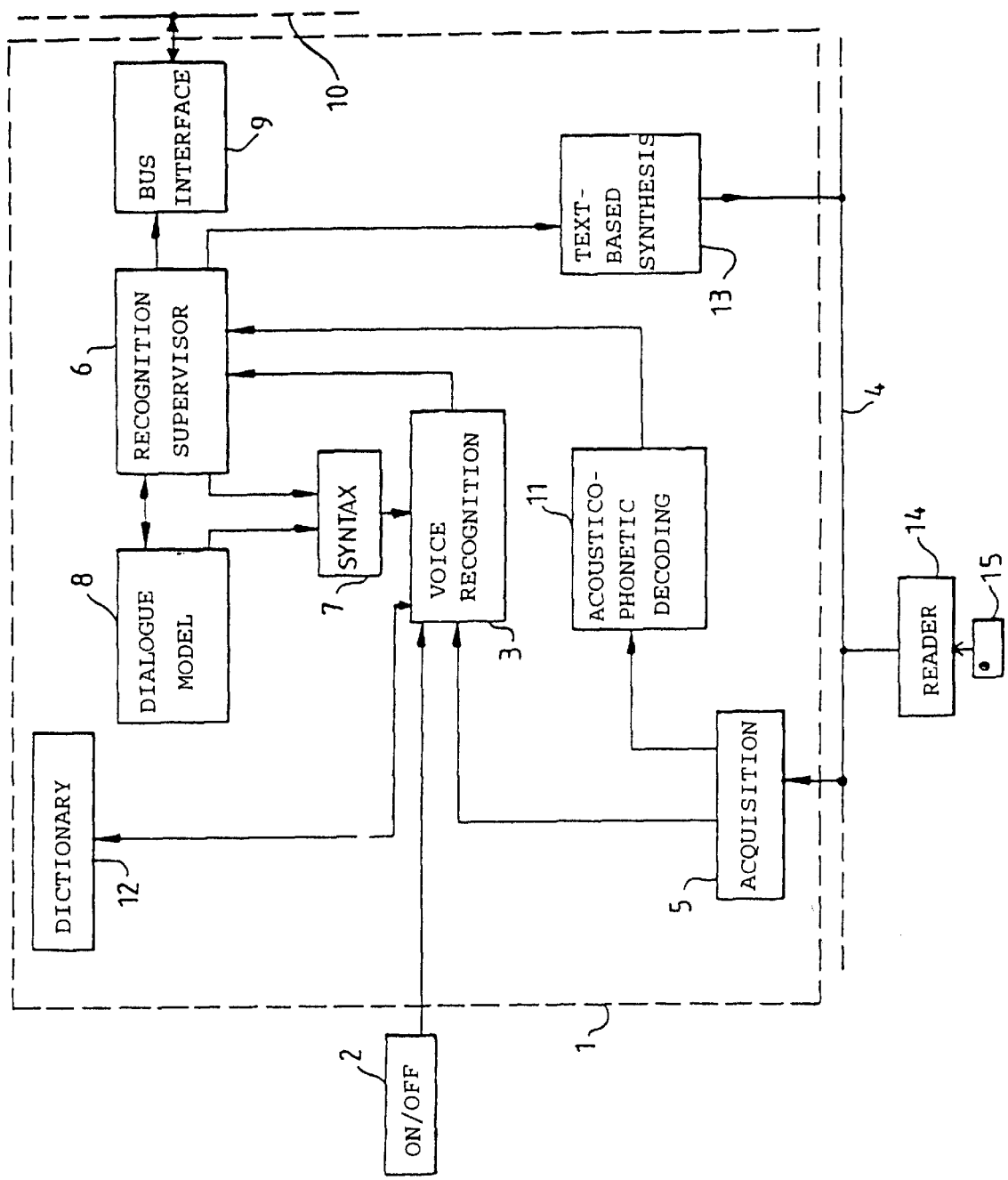

PROCESS OF VOICE RECOGNITION IN A HARSH ENVIRONMENT, AND DEVICE FOR IMPLEMENTATION

BACKGROUND OF THE INVENTION

1. Field of the Invention

The present invention relates to a process of voice recognition and to a system of voice command in a "harsh" environment, that is to say one that is strongly disturbed not only by noise, but by various physical and physiological factors which may act on the user.

2. Discussion of the Background

In a harsh environment such as for example that prevailing in the cockpit of a military aircraft, the apparatuses for voice capture, restitution and processing are not optimized, and are even, mostly, poorly implemented. The radio communications between the crew and other speakers are of poor quality. The users communicate with several other speakers (other aircraft, ground stations, the other members of the crew, their own voice back again). These communications are monophonic, affected by interference, fairly unintelligible and are not hierarchized. Furthermore, various physical and physiological factors may disturb the capabilities of the user. Among these factors may be noted in particular the load factor of the aircraft, the oxygen mask, high respiratory pressure, pilot stress. These poor communications, when added to the environmental noise, contribute significantly to the fatigue of crews, and may even harm their health. The helmets which they wear protect them hardly at all from such noise. The only means available to them to try to make these communications somewhat more intelligible are controls for adjusting sound level, this being far from satisfactory. The various apparatuses which implement these sound communications are dissimilar and their characteristics are not always completely compatible. Furthermore, the growing complexity of on-board systems entails an overload of work for the operator, provoking stress, loss of concentration and eventually of efficiency, this being particularly injurious to the pursuance of a mission under the best conditions. In this context, a voice command device with high recognition rate is particularly beneficial since it makes it possible to control a complex system in a relatively direct and natural way without mobilizing the entire attention of the operator, something which is far from being the case when using tactile surfaces, keyboards, multi-position buttons.

SUMMARY OF THE INVENTION

The subject of the present invention is a voice command system, in particular for a noisy environment, capable of achieving a high recognition rate (typically 95%) with a vocabulary of the order of a few hundred words, and phrases which may contain 10 words and more.

The process of the invention is characterized in that it consists in performing a coarse recognition, then after comparing with stored acoustic references, in supplying the N best phrases recognized, in choosing from these N best phrases, by comparing them with models of probable dialogues and by performing an acoustico-phonetic decoding, the most likely phrase.

The voice recognition system in accordance with the invention includes an acquisition device linked to an acoustico-phonetic decoding device, itself linked to a recognition supervision device, as well as to a voice recognition device, which is itself linked to a dictionary, to the recognition supervisor and to a syntax recognition device, the latter being linked to a dialogue storage device, which is linked to the supervisor.

BRIEF DESCRIPTION OF THE DRAWINGS

The present invention will be better understood on reading the detailed description of an embodiment, taken by way of non-limiting example and illustrated by the appended drawing in which:

the single FIGURE is a block diagram of a voice command system in accordance with the invention.

DISCUSSION OF THE PREFERRED EMBODIMENTS

The invention is described below with reference to an aircraft audiophone system, in particular for a combat aircraft, but it is of course not limited to such an application and can be implemented equally well in other types of vehicles (land or sea) and in fixed installations, in particular in very noisy surroundings, such as, for example, in metallurgical plants. The user of this system is, in the present case, the pilot of a combat aircraft, but there may of course be several simultaneous users, in particular in the case of a civil transport aircraft, devices specific to each user being provided in corresponding number.

The voice recognition system 1 is operated by a push-button 2 also denoted by the term "voice command on/off button". This button 2 is required to distinguish the communication signals (on-board intercommunications, radio communications) from the vocal orders issued by the user. Pressing this on/off triggers the algorithmic procedures of the voice recognition device 3. This device 3 continually receives the frames of microphone samples (originating from a microphone circuit, not represented, via a conductor 4 which may be a bus) and stashes them in a buffer area of a memory 5 (able to store for example 150 ms of speech) so that this circuit can search for a start of enunciation prior to pressing the button 2.

The device 3 is linked to a recognition supervisor device 6 and via a syntax recognition device 7 to a device 8 for storing and checking models of dialogues, which is itself linked to the device 6. The device 6 is linked via an interface 9 and via a bus 10 to a management processor, not represented. The device 1 also includes an acoustico-phonetic decoding device 11 linking the memory 5 to the supervisor 6, a dictionary of acoustic references 12 linked to the device 3, and a device 13 for text-based synthesis linking the supervisor 6 to the bus 4. The dictionary 12 is linked, via the bus 4, to an interface 14 which advantageously co-operates with a customization memory card 15 in which are stored the parameters relating to the speaker possessing this card, so as to optimize the acoustic references of the dictionary 12. Of course, the card reader and the cards may be replaced by any equivalent device (plug-in ROM, remote loading, etc.).

The device 3 supplies the supervisor circuit 6 with the phrase or phrases recognized on the basis of the samples which it receives from the memory 5. The device 3 includes, in conventional manner, three parts: acquisition, parametrization and pattern recognition. Acquisition of the voice signal originating from the bus 4 is advantageously carried out at a sampling frequency of 12 kHz, for words 16 bits wide.

The parametrization carries out a characterization/compression of the voice signal: from a frame of 256 16-bit samples, 8 8-bit cepstral coefficients are supplied. This phase is advantageously supplemented and improved in a noisy environment by activity-detection and noise-suppression processes. The detection allows accurate pinpointing of the actual start and finish of speech so as to overcome problems of synchronization between enunciation and press/release of the on/off. The algorithm is based on the detection of voicing (search for harmonic structures) and of unvoiced sounds (loosely called fricatives) and is enhanced by an assessment phase making it possible to define the structure of the enunciation: vocalic nucleus and fricative blocks preceding or following this nucleus. Noise suppression is involved at two levels: in the detection phase, in the form of rejection filtering (whitening) to heighten the acuity of detection, in the "conventional" parametrization chain, in the form of frequency filtering (WIENER filtering for example) to increase the quality of the parametrization in a harsh environment. Noise suppression uses dual modelling of noise: autoregressive modelling by adaptive filtering or linear prediction, estimation of the $2^{nd}$ order moment of the mean noise spectrum for frequency filtering. The search for the noise frames should, as far as possible, be local to the enunciation so as to preserve as a first approximation the assumption of the stationarity of the noise. The use of the button 2, whichever mode of conversation is chosen, permits the implementation of an algorithm for selecting noise frames which is compatible with voice recognition and microphone noise suppression.

Pattern recognition performs dynamic comparison (calculation of distance) between the spectra arising from the parametrization and the "reference" spectra created by the operator during the learning phase and loaded into memory before flight (single-speaker voice recognition). Depending on the results of these calculations, it is possible to adopt several solutions which will be sorted by the recognition supervisor module, rather than a single solution (the "best" phrase recognized in the sense of the pattern-recognition algorithm). Furthermore, the syntax used to build the voice command language can consist of nested sub-syntaxes with a less complex tree arrangement: under impaired conditions, the "voice command" functionality can thus be retained with high-performance recognition, eliminating the errors due to an excessively large branching factor. The pilot can thus choose a working syntax on the basis of the type of and alterations in his mission, this change of syntax can also be made automatically on the basis of the state of the sensors linked to the supervisor (inertial rig, angle of incidence probe, etc.) during alterations under load factor, for example.

The role of the device 8 is to take account of the "operational context" of the command uttered and of the pilot/machine interactions (orders recently given, configuration of the aircraft, mission scenario in the case of a military aircraft, etc.) so as to weight the syntax arcs between the words in a deterministic manner. This weighting takes into account various factors such as: the configuration of the aircraft's navigation and weapons system, the state of the aircraft's physical sensors (inertial rig, load factor, etc.), the history of the dialogue, the content of the dictionary 12, the modelling of the dialogues and of the task, the acoustico-phonetic decoding which carries out a first rejection on the basis of phonetic criteria, the various phrases recognized, etc. These operations are monitored by the supervisor 6. Thus, the invention makes it possible to optimize voice recognition in the "harsh" environment as defined above. Thus, this circuit performs "intelligent" dynamic processing of the context so as to remove ambiguities of recognition, favouring or penalizing certain enunciations relative to others (for example, it avoids selecting frequencies determined under load factor, that is to say when the pilot does not have his customary enunciation.

The acoustico-phonetic decoding is performed in parallel with the conventional parametrization/recognition of the signal. The objective is to determine the phonetic components of the voice signal and to allocate each signal segment the signature of a phoneme or at the very least, to begin with, the signature of a class of phonemes: radar contains [r] [a] [d] [a] [r] (voiced liquid, voiced, voiced explosive, voiced, voiced liquid). A further item of information is supplied to the supervisor which will thus be able to penalize certain phrases identified as being similar from the distance calculation point of view but phonetically incompatible ("auto" and "stop" for example).

The supervisor device 6 is responsible for supplying the validated command to the interface 9. This command should be the best phrase recognized, recognition taking account of the information from the aircraft sensors (inertial rig, load factor sensors, angle of incidence sensor, etc.), of the dialogue model (8) and of the acoustico-phonetic decoding (11).

The text-based synthesis device 13 generates by voice synthesis the recognized command so as to send it, via the bus 4, to the pilot's listening feedback circuit. Advantageously, this circuit does not use digitized words stashed in memory which would be restored on demand, but on the contrary re-creates the acoustico-phonetic components of the recognized enunciation on the basis of its orthographic formulation.

To summarize, the roles of the various recognition devices of the system 1 are as follows: the device 3 performs by a process known per se (for example by signal parametrization and pattern recognition), on the basis of an enunciation, stored in 5, coarse recognition, and then supplies the N best phrases recognized belonging to a given syntax (verified in 7) after comparing with acoustic references stored in 12.

The acoustico-phonetic decoding device 11 undertakes an analysis of a type known per se (for example by implementing a bank of filters and by searching for the characteristic phonetic features, and next supplies the more or less detailed phonetic structure of the words having just been uttered. This detection of phonetic structure may for example consist simply in distinguishing the voiced areas from the unvoiced areas.

The device 8 makes it possible to update the syntax base in which the search for the recognized phrase is made, that is to say to narrow or widen this base. This updating is carried out as a function of one at least of the following parameters: parameters of the carrier craft (angle of incidence, load factor, etc. if this craft is an aeroplane), type and phase of the mission in progress (if it is a combat aircraft: cruising, attack, take-off, approach, etc.), history of the voice commands previously executed (and hence having been successfully recognized), and possibly the phonetic structure of the enunciation depending on the possibilities of the device 11. Advantageously, this device 8 is capable of allowing the vocal orders to be reused without completely repeating the command, following an error of recognition or an error attributable to the operator (for example, if the phrase recognized is: "show engine page on left display", the operator can correct in the following way: "no, radar page" or "no, the right").

The device 6 is responsible for making the decision regarding THE phrase (which will become a vocal command) recognized on the basis of the information supplied by the devices 3, 11 and 8. This device 6 codes the recognized phrase as a string of symbols comprehensible to the devices 9 and 13. The interface device 9 is responsible for forwarding the corresponding order to the equipment relevant to the vocal command issued. The device 13 is advantageously responsible for vocally restoring an acknowledgement of the action corresponding to the command if, for example, there is no visual check associated with the action to be executed. Moreover, the device 6 informs the device 8 of the decision made, for the updating of the history of the commands issued.

The voice recognition performed by the devices described above can, for example pan out as follows: the operator presses the on/off 2, utters a phrase, which is acquired (stored) in 5. The resulting signal is processed and recognized in 3 and 11. The results of the analysis are forwarded to the supervisor 6. The N best phrases (those most resembling the result of the recognition by the device 3) are chosen by 7. The device 6 makes a decision on the basis of these N best phrases with the help of the information regarding phonetic structure (voicing, frications) supplied by 11. The supervisor 6 updates the history of the commands, supplementing the content of 8. The latter also performs a weighting of the active syntax: for example, in the case of a selection of radio stations, the corresponding commands will be preferred during the enunciation of the next commands. The order chosen by the supervisor 6 is, in the present case, forwarded to the interface 9, rather than to the device 13, since the result can be checked visually (display of the radio channel chosen for example).

What is claimed is:

1. A process of voice recognition, comprising the steps of:
   performing a coarse recognition of acquired samples, said coarse recognition being based on searching a syntax base,
   supplying the N best phrases recognized after comparing results of said coarse recognition with stored acoustic references,
   determining phonetic components of said acquired samples by performing an acoustico-phonetic decoding on said acquired samples,
   choosing a most appropriate phrase from said N best phrases by comparing said N best phrases with models of probable dialogues and with said phonetic components, and
   updating said syntax base as a function of a history of most appropriate phrases chosen in said choosing step.

2. Process according to claim 1, characterized in that the models of dialogue are selected on the basis of the operational context of the recognition.

3. Process according to claim 2, characterized in that the models of dialogue are selected by weighting the syntax arcs between the words, the weighting taking into account, apart from the environmental noise, one at least of the following factors: the state of sensors of physical quantities relating to the surrounding conditions, the history of the dialogues, the content of a dictionary of acoustic references, the modelling of the dialogue and of the task to which the dialogues relate, the acoustico-phonetic decoding which carries out a first rejection on the basis of phonetic criteria, the various phrases already recognized.

4. Process according to claim 3, applied to a fighter aircraft, characterized in that the physical quantities relating to the surrounding conditions comprise the characteristics of the aircraft's navigation and weapons system, and the state of the aircraft's sensors including an inertial rig and a load factor.

5. System for voice command in a harsh environment, for implementing the process according to claim 1, characterized in that it includes an acquisition device linked to an acoustico-phonetic decoding device, itself linked to a recognition supervision device, as well as to a voice recognition device, which is itself linked to a dictionary, to the recognition supervisor device and to a syntax recognition device, the latter being linked to a dialogue storage device, which is linked to the supervisor device.

6. System according to claim 5, characterized in that it is linked to a memory card interface, co-operating with customization memory cards in each of which are stored parameters relating to the corresponding speaker.

7. System according to claim 6, characterized in that the voice recognition device is a pattern recognition and signal parameterization device.

8. System according to claim 7, characterized in that the acoustico-phonetic decoder device is an analysis device having banks of filters.

9. System according to claim 6, characterized in that the acoustico-phonetic decoder device is an analysis device having banks of filters.

10. System according to claim 5, characterized in that the voice recognition device is a pattern recognition and signal parametrization device.

11. System according to claim 10, characterized in that the acoustico-phonetic decoder device is an analysis device having banks of filters.

12. System according to claim 5, characterized in that the acoustico-phonetic decoder device is an analysis device having banks of filters.

13. The process of claim 1, further comprising updating said syntax base as a function of environment parameters.

14. The process of claim 13, wherein updating said syntax base is performed as a function of environment parameters corresponding to an aircraft environment.

15. The process of claim 13, wherein updating said syntax base is performed as a function of environment parameters corresponding to a sea vehicle environment.

16. The process of claim 13, wherein updating said syntax base is performed as a function of environment parameters corresponding to a land vehicle environment.

17. The process of claim 13, wherein updating said syntax base is performed as a function of environment parameters corresponding to a metallurgical plant environment.

18. The process of claim 1, further comprising updating said syntax base as a function of aircraft specific commands.

19. The process of claim 1, further comprising updating said syntax base as a function of said phonetic components of said acquired samples.

20. The process of claim 1, wherein updating said syntax base is performed so as to allow an operator to correct an error of recognition or an error attributable to said operator without a command corresponding to said acquired samples being repeated.

* * * * *